United States Patent
Wallis

(10) Patent No.: US 6,994,067 B2
(45) Date of Patent: Feb. 7, 2006

(54) VALVE TIMING MECHANISM FOR A ROTARY VALVE INTERNAL COMBUSTION ENGINE

(75) Inventor: Anthony Bruce Wallis, Gladesville (AU)

(73) Assignee: Bishop Innovation Limited, North Ryde (AU)

(*) Notice: Subject to any disclaimer, the term of this patent is extended or adjusted under 35 U.S.C. 154(b) by 0 days.

(21) Appl. No.: 10/478,808

(22) PCT Filed: May 30, 2002

(86) PCT No.: PCT/AU02/00687

§ 371 (c)(1),
(2), (4) Date: Mar. 5, 2004

(87) PCT Pub. No.: WO02/097244

PCT Pub. Date: Dec. 5, 2002

(65) Prior Publication Data

US 2004/0144361 A1 Jul. 29, 2004

(30) Foreign Application Priority Data

May 30, 2001 (AU) .................................... PR5315

(51) Int. Cl.
F01L 1/34 (2006.01)
(52) U.S. Cl. .................... 123/190.8; 123/347; 123/321
(58) Field of Classification Search ............ 123/190.1, 123/190.4, 190.5, 190.6, 190.8, 90.18, 347, 123/321, 348, 362
See application file for complete search history.

(56) References Cited

U.S. PATENT DOCUMENTS

| | | | |
|---|---|---|---|
| 4,036,184 A | 7/1977 | Guenther | |
| 4,815,428 A * | 3/1989 | Bunk | 123/190.8 |
| 4,834,038 A * | 5/1989 | Montagni | 123/190.8 |
| 5,074,265 A * | 12/1991 | Ristin et al. | 123/292 |
| 5,105,784 A | 4/1992 | Davis et al. | |
| 5,205,251 A | 4/1993 | Conklin | |
| 5,392,743 A * | 2/1995 | Dokonal | 123/190.8 |
| 5,490,485 A * | 2/1996 | Kutlucinar | 123/190.4 |
| 5,526,780 A * | 6/1996 | Wallis | 123/190.6 |

(Continued)

FOREIGN PATENT DOCUMENTS

DE 40 22 823 A 1/1992

(Continued)

Primary Examiner—Henry C. Yuen
Assistant Examiner—Jason Benton
(74) Attorney, Agent, or Firm—Birch, Stewart, Kolasch & Birch, LLP

(57) ABSTRACT

A rotary valve internal combustion engine comprising a crankshaft, a throttle (23), a throttle actuator, a cylinder head (7), a combustion chamber (8), and at least one rotary valve (1). The rotary valve (1) having at least two ports (2, 3) terminating as openings (4, 5) in its periphery, the cylinder head (7) having a bore (11) in which the rotary valve (1) rotates, a window (6) in the bore (11) communicating with the combustion chamber (8), the openings (4, 5) successively aligning with the window (6) by virtue of the rotation, a drive mechanism comprising a phase change means (18), the drive mechanism driving the rotary valve (1). The at least two ports (2, 3) comprise an inlet port (2) and an exhaust port (3), and the phase change means (18) applies a phase change in response to changes in the operating conditions of the engine over at least one engine cycle.

24 Claims, 11 Drawing Sheets

U.S. PATENT DOCUMENTS

| | | | | |
|---|---|---|---|---|
| 5,588,411 A | * | 12/1996 | Kreuter et al. | 123/339.14 |
| 5,676,112 A | * | 10/1997 | Bauer et al. | 123/333 |
| 5,706,775 A | * | 1/1998 | Schweter et al. | 123/190.12 |
| 6,443,116 B1 | * | 9/2002 | Dahlborg | 123/190.6 |
| 6,763,788 B2 | * | 7/2004 | Wallis | 123/80 BA |
| 6,840,201 B2 | * | 1/2005 | Miura | 123/90.15 |

FOREIGN PATENT DOCUMENTS

| | | |
|---|---|---|
| EP | 0 579 902 A1 | 1/1994 |
| GB | 2 072 264 A | 9/1981 |
| GB | 2072264 A * | 9/1981 |
| GB | 2 239 901 A | 7/1991 |
| JP | 9-32518 A | 2/1997 |

* cited by examiner

VALVE TIMING MECHANISM FOR A ROTARY VALVE INTERNAL COMBUSTION ENGINE

TECHNICAL FIELD

The present invention relates to variable valve timing mechanism for a rotary valve assembly used in an internal combustion engine, and more particularly to a variable valve timing mechanism where both the inlet port and the exhaust port are in the same rotary valve.

BACKGROUND

Rotary valve arrangements have been proposed by many people. One recent example is that proposed by U.S. Pat. No. 5,526,780 (Wallis). Common to all these rotary valve arrangements is an opening in the rotary valve's periphery that periodically aligns with a similar shaped window in the combustion chamber. When the opening in the rotary valve's periphery aligns with the window in the combustion chamber, fluid can pass into (in case of the inlet stroke) and out of (in the case of the exhaust stroke) the combustion chamber. When the opening in the valve's periphery is not aligned with the window in the combustion chamber the contents of the cylinder are trapped during the compression and combustion stroke.

In most prior art arrangements the rotary valve is driven at a fixed angular velocity ratio to the crankshaft. This is achieved by way of mechanical drive mechanisms such as gear trains, chain drives or belt drives which transmit constant angular velocity ratios.

"Angular velocity ratio" is the ratio obtained when the angular velocity of the rotary valve is divided by the angular velocity of the crankshaft.

Although rotary valves for internal combustion (IC) engines are the subject of numerous patents none have been commercialized. This is a result of a myriad of problems characteristic to rotary valves that have never been adequately resolved. One particular arrangement that has resolved many of these problems is the rotary valve arrangement disclosed in U.S. Pat. No. 5,526,780. This arrangement consists of a single rotary valve per cylinder which incorporates both an inlet and exhaust port in the same valve. Whilst the mechanical problems afflicting this concept have been resolved other issues are now impacting on commercial adoption of this technology. In recent years increasingly stringent emissions regulations have been adopted around the world. The IC engine manufacturers are meeting these regulations by the production of IC engines with variable valve timing. In these engines the valve timing of the inlet and exhaust are independently varied.

The arrangement disclosed in U.S. Pat. No. 5,526,780 suffers from the problem that both the inlet and exhaust port are housed in the same valve thus making independent variation of the inlet and exhaust timing impossible. This is widely held to be such a disadvantage that it will prevent future commercialization of such rotary valves despite their other considerable advantages.

This invention addresses these problems with a mechanism that allows a rotary valve with both inlet and exhaust ports in the same valve to satisfactorily address these emission issues whilst also improving the IC engines efficiency. In addition this mechanism is also used to improve full throttle performance.

Valve timing is generally expressed as the location of the inlet open, inlet close, exhaust open and exhaust close points relative to the crankshaft position. The crankshaft position is generally specified as an angle relative to a reference location. This is generally chosen to be the location where the piston is at the top of its stroke (i.e. top dead centre—tdc). If the exhaust closes 15° after tdc the exhaust port will cease communication with the cylinder when the crankshaft has rotated 15° from the position where the piston was at tdc. In other instances the reference location is chosen to be the location where the piston is at the bottom of its stroke (i.e. bottom dead centre—bdc)

Alternatively valve timing can be thought of as a combination of durations—inlet duration, exhaust duration, close duration and overlap duration together with a initial position and phase. The initial position determines the relationship between the crankshaft position and the rotary valve position at some point.

"Overlap" is that portion of the engine cycle where both inlet and exhaust ports are both simultaneously open to the combustion chamber.

"Duration" is the angle the crankshaft rotates through between any two events.

"Inlet duration" is the angle the crankshaft rotates through when the inlet port is in communication with the combustion chamber i.e. between inlet open and inlet close. Similarly "exhaust duration" is the angle the crankshaft rotates through when the exhaust port is in communication with the combustion chamber i.e. between exhaust open and exhaust close. "Close duration" is the angle the crankshaft rotates through when neither the inlet nor the exhaust port are open to the combustion chamber i.e. between inlet close and exhaust open. This occurs during the compression and power strokes on a four-stroke engine. "Overlap duration" is the angle the crankshaft rotates through when both the inlet and exhaust ports are simultaneously open to the combustion chamber i.e. between inlet open and exhaust close.

In all internal combustion engines synchronization of the valve events to their correct position in the engine cycle is essential. Phase is used to describe this synchronization. If the phase is constant from cycle to cycle the valve events will occur in exactly the same position in the cycle from one cycle to the next.

The position in the cycle is defined by the crankshaft position. The position of the rotary valve is described by the angle the valve has rotated from a reference location usually chosen as one of the easily observable valve events—i.e. inlet valve open (ivo), inlet valve close (ivc), exhaust open (evo) or exhaust valve close (evc). For ease of reference we have chosen the reference location to be ivo. "Rotary valve position" is defined as the angle the valve has rotated from the ivo point.

For conventional rotary valve internal combustion engines using drive mechanisms that deliver constant angular velocity ratio, the position of the rotary valve relative to the cycle position can be represented by a graph of the type shown in FIG. 11. Line 53 defines the position of the rotary valve for all crankshaft positions. So long as the relationship defined by this line occurs on successive cycles, phase has remained constant. In the event the relationship between rotary valve position and crankshaft position is at some other time represented by line 54, a phase change is said to have occurred and its magnitude is σ. In the event line 53 is chosen as the reference, the phase is σ°.

"Phase" is defined as the distance in crankshaft degrees that the line 54 defining constant phase has shifted relative to a reference line 53 defining constant phase.

"Phase change" is defined as the distance in crankshaft degrees that any line defining constant phase has shifted relative to any other line defining constant phase.

Phase change is defined as positive if the change is such that the inlet valve opens later in the engine cycle. A phase change from line 53 to line 54 in FIG. 11 is positive.

Phase change is defined as negative if the change is such that the inlet valve opens earlier in the engine cycle.

In conventional poppet valve engines there are practical limitations as to how far the timing may be varied from its nominal position. This is a result of the fact that the poppet valves open into the combustion chamber. When the piston is at tdc on the induction stroke the crown of the piston is very close to the heads of the protruding poppet valves. The higher the compression ratio, the greater the number of valves and the greater the bore/stroke ratio the closer the valve must come to the piston crown. Modem engines seek to maximize these variables. Timing variations that require the poppet valve to protrude further into the combustion chamber are therefore restricted in magnitude. Compared to their full throttle timing, variations are generally restricted to opening the inlet later or closing the exhaust earlier, both of which increase the distance between the head of the poppet valve and the piston crown.

All engines require a certain amount of overlap at full throttle to obtain the optimum power result. At low throttle settings this overlap can result in excessive internal exhaust gas recirculation (EGR) causing poor combustion stability with resultant "rough running" and excessive hydrocarbon emissions. The poppet valve manufacturers vary the valve timing to reduce the overlap to a minimum at part throttle or low load operation. Generally speaking the timing variation is limited to the magnitude of the maximum angle the valve opens or closes from tdc. For example most engines typically require the inlet valve to open 15° before tdc and the exhaust valve to close 15° after tdc to obtain maximum power. Phase changes are typically limited to a maximum of about 15° from the full throttle phase position.

There is generally a practical limit to the amount of phase change that can be applied to a poppet valve arrangement with a fixed duration cam. If the inlet valve open position is moved from 15° before tdc to tdc when the engine is operating at low load, the inlet close point will also occur 15° later. This later valve closing will result in a considerable loss of charge that will be pumped out of the cylinder back into the inlet port with consequent loss of efficiency. Consequently phase changes are generally limited to a magnitude that will achieve a satisfactory internal EGR result—approximately 15°. In the event larger changes are required manufacturers have introduced devices that alter the inlet and exhaust duration. In this event the size of the allowable phase changes is extended.

Rotary valves on the other hand do not protrude into the combustion chamber. There is therefore no physical limit to how far the valve timing may be varied. This creates the possibility of solutions that are not available to poppet valve engines. This invention phases shifts a rotary valve with both inlet and exhaust ports in the same valve in response to changes in engine operating conditions. Essentially the inlet and exhaust are simultaneously phase changed an equal amount whilst maintaining their inlet and exhaust durations at their full throttle magnitude. This invention requires the use of large phase changes in certain operating situations. On a poppet valve engines such a strategy is not physically possible. For example if a poppet valve mechanism applied a simultaneous phase change of equal magnitude to both inlet and exhaust valves whilst maintaining the same full throttle inlet and exhaust durations, either the inlet or exhaust valves would soon hit the piston, depending on whether the phase change was positive or negative. On a poppet valve engines only small phase changes of this type can occur before the valves hit the piston. The magnitude of the phase change that can occur prior to the valves hitting the piston will vary with the design of the engine. However in modern high performance poppet valve IC engines (twin overhead cam 4 valve engines with high compression ratios) this would generally be limited to less than 10°.

Throughout this specification, in arrangements where the duration of inlet and/or exhaust is fixed, it is understood that a "large phase change" or a "large magnitude of phase change means a phase change greater than 15° and typically greater than 25°.

All known variable timing proposals for rotary valves have however adopted strategies that mimic those used by poppet valve engine manufacturers. All prior art variable timing rotary valve proposals use arrangements with separate valves for the intake and exhaust ports. These arrangements have the advantage that the inlet and exhaust port timing can be varied independently and can thus mimic the poppet valve strategy of independently phase changing the inlet and exhaust valve timing. U.S. Pat. No. 5,205,251 (Conklin) is an example.

U.S. Pat. No. 5,205,251 (Conklin) describes a means of varying the valve timing of a rotary valve engine fitted with two rotary valves per cylinder. One rotary valve contains an inlet port and the other rotary valve contains an exhaust port. The rotary valves are housed inside sleeves and are able to rotate within these sleeves. The sleeves are rotatably disposed within the cylinder head. Timing variation of the inlet or exhaust events is achieved by a combination of rotation of the sleeves and variation of the rotary valve's angular velocity during the cycle. In this arrangement the variation in the rotary valve's angular velocity during the cycle varies either the inlet and/or the exhaust duration. The rotation of the sleeve varies the location of the inlet and/or the exhaust events relative to the crankshaft or the phase of these events relative to the crankshaft. The combination of variations in the angular velocity of the rotary valves and rotation of the sleeves allows independent movement of the inlet open, inlet close, exhaust open, and exhaust close points.

The provision of a sleeve and an additional mechanism to vary its location is an additional complication and also introduces additional gas sealing difficulties. U.S. Pat. No. 5,205,251 remains silent on how gas sealing is achieved. However it is clear that gas sealing will be required between the combustion chamber and the sleeve and between the sleeve and the rotary valve. There is no known practical solution for this arrangement and the requirement to seal in two places merely increases the complexity.

The drive mechanism disclosed in U.S. Pat. No. 5,205, 251 to vary the angular velocity of the rotary valve during the cycle is complicated and would be difficult to implement in practice. The eccentric gear must have provision to vary the eccentricity while it rotates and the idler that this gear engages must be able to move its centre continuously throughout the cycle. A separate mechanism is required for each valve.

Any arrangement that varies the timing by use of a sleeve requires a window in the cylinder head that is wider than the opening in the valve. This is well illustrated in FIGS. 2 and 5 in U.S. Pat. No. 5,205,251. As the breathing capacity of the rotary valve is determined in part by the width of the opening in the rotary valve, there is no practical requirement for the window in the head to be wider than the rotary valve opening apart from that introduced by the use of the sleeve. Consequently the breathing capacity of the rotary valve is unnecessarily limited. The wider window in the cylinder head also has the following additional problems. Firstly, the gas loads imposed on the rotary valve during combustion are directly proportional to the cylinder head window width and are therefore unnecessarily high in the case of applications using sleeves to vary timing. Secondly, the volume occupied by these windows is unnecessarily high and makes design of combustion chambers having the required compression ratios difficult.

A single rotary valve incorporating both inlet and exhaust ports in the same valve is a substantial improvement over arrangements requiring separate valves for the inlet and exhaust ports. The following considerations make this clear.

Two important features relevant to all valve mechanisms for internal combustion engines are the rate at which the valve opens and closes, and the maximum breathing capacity of the valve system. In the case of rotary valves the length of the window in the cylinder head and the valve diameter determine the rate at which the valve opens and closes. The length of the window is geometrically constrained by the requirement to have it located within the bore of the cylinder and can be made a similar length whether there are one or two valves per cylinder. The maximum breathing capacity is determined by the valve diameter. Thus, for the same maximum breathing capacity, the valve diameter for the rotary valve with a single inlet port must be the same as the valve diameter for a valve with both inlet and exhaust ports in the same valve. Consequently, a single valve incorporating both the inlet and exhaust ports in the same valve will have the same maximum breathing capacity and open and close rates (i.e. the same breathing capacity) as will two rotary valves incorporating inlet and exhaust ports in separate valves but with half the number of components.

In arrangements where maximum breathing capability is required it is necessary to make the diameter of the rotary valve as large as possible. Physical packaging constraints allow single rotary valves of much greater diameter than is possible with twin rotary valves. The ultimate breathing capacity of an arrangement with a single rotary valve incorporating inlet and exhaust ports in the same valve is therefore much greater than that of an arrangement with two rotary valves each of which contain a single port.

In addition, a twin rotary valve incorporating inlet and exhaust ports in separate valves will have twice the number of bearings and seals as required with a single valve incorporating both inlet and exhaust ports in the same valve.

Consequently, friction losses in the two-valve arrangement are potentially double those in the single valve arrangement with both inlet and exhaust ports in the same valve.

In the event other considerations require the use of two valves per cylinder, two rotary valves incorporating both inlet and exhaust ports in the same valve will have twice the opening and closing rate for the same window length as will two rotary valves of the same incorporating only a single port in each valve. This assumes the diameter of both types of valves is the same. In this case the arrangement with both inlet and exhaust ports in the same valve will have twice the maximum breathing capacity. Consequently two valves incorporating both inlet and exhaust ports in the same valve will have twice the breathing capacity of two valves of the same diameter incorporating the inlet and exhaust valves in separate rotary valves.

Whilst attempts have been made to address the issue of variable valve timing in rotary valve arrangements where the inlet port and exhaust port are accommodated in separate rotary valves, no attempts have been made to address the inherently more difficult arrangement where both the inlet and exhaust ports are accommodated in the same rotary valve.

This added difficulty arises because, in this arrangement, the phasing between the exhaust events and the inlet events are fixed by the geometry of the rotary valve. A simple phase change between a rotary valve incorporating both inlet and exhaust ports and the crankshaft cannot therefore effect a change in the location of the inlet and exhaust relative to each other. By way of comparison, the use of separate rotary valves for the inlet port and the exhaust port means a simple phase change between one or both of the rotary valves and the crankshaft will change the phasing between the inlet and exhaust and will alter the overlap.

In addition on a single rotary valve incorporating both inlet and exhaust ports in the same valve there is no known way of changing the overlap duration.

In a single rotary valve arrangement the overlap duration is physically determined by the width of the bridge between the inlet and exhaust ports on the rotary valve and the width of the window in the cylinder head. Typically the width of the bridge is smaller than the width of the window as shown in FIG. 6. This arrangement produces overlap. As the magnitude of the overlap is physically determined by the details machined into the rotary valve and cylinder head, there is no way of varying the magnitude of the overlap. Consequently, the conventional valve timing strategies used on poppet valves and twin rotary valves are not available to engines fitted with a single rotary valve. This is an inherent limitation of any rotary valve incorporating both inlet and exhaust ports in the same valve.

There are two instances in the patent literature where timing variation is mentioned in relation to rotary valves incorporating both inlet and exhaust ports in the same valve. GB patent 2 072 264 (Williams) describes a rotary valve engine incorporating both inlet and exhaust ports in the same valve. This single valve is connected to two or more cylinders. The arrangement as described is not capable of satisfactorily functioning as an IC engine. This can be ascertained by the following considerations. FIG. 5A of GB patent 2 072 264 and the text describe a rotary valve where the openings in the periphery of the rotary valve subtends an angle (centred on the rotational axis of the rotary valve) of 60°. The cylinder opening 101 communicating between the openings in the valve periphery and the cylinder subtend an angle of 45°. As the cylinder openings are 90° apart, the angle subtended between closing edge of one cylinder opening and the opening edge of the adjacent cylinder opening is 45°. It is clear that when the valve is rotated 45° clockwise from the position shown in FIG. 5 of GB patent 2 072 264 that the inlet port will be simultaneously open to both cylinder 50 and cylinder 52. As cylinder 52 is on the exhaust stroke and cylinder 50 is on the inlet stroke, the inlet port is now open to two cylinders on different strokes. This is clearly unworkable.

GB patent 2 072 264 seeks to make a virtue of this fact. It asserts that as a result of the angle subtended by the opening in the periphery of the valve being greater than the angle subtended by the cylinder opening it is possible to vary the length of time that the valve has full opening because of the mechanism that can vary the timing of the valve while the engine is running. The patent makes no disclosure as to how this variation in the length of time that the valve is fully open, is achieved. Further there is no known means of varying the timing to achieve such a result. The result cannot be achieved by introducing a phase change (the subject of this invention) as this will merely change the valve's timing but not the length of time the valve is fully open. The concept of varying the length of time the valve is fully opened has little merit in light of the following issue.

In any rotary valve engine the maximum breathing capacity is obtained by making the opening in the periphery of the valve and the window as large as possible. For any given duration the optimum breathing capacity is obtained when the width of the opening in the periphery of the valve and the width of the window are the same. When as disclosed in GB patent 2 072 264 the width of the window is deliberately made narrower than the width of the opening in the periphery, the maximum breathing capacity of the arrangement is reduced by virtue of the smaller window opening than would be available if both were the same size. The concept of then introducing some undisclosed method of increasing the time the valve is in the fully open condition (presumably to increase breathing capacity) has little merit given that it will never achieve the breathing capacity that a simple change to the geometry of the part will achieve.

These issues are all addressed in JP patent 9-32518 (Sakochi). In this patent a single rotary valve incorporating an inlet and exhaust port in the same valve is disclosed. This valve is shared between two cylinders. FIG. 11 of JP patent 9-32518 shows that the openings in the periphery of the valve and the window all have the same width and all subtend an angle of 45°. Further the angle subtended by the closing edge of one window and the opening edge of the adjacent window is also 45°. This overcomes the problem of GB patent 2 072 264 where the inlet (or exhaust) port can simultaneously be open to adjacent cylinders on different strokes. However this arrangement has a bridge between the inlet port and the exhaust port that subtends 45°. When this bridge is positioned directly over the window, the window is completely blocked. Hence this arrangement has zero overlap.

Zero overlap is a necessary restraint on any design where a single rotary valve feeds two or more adjacent cylinders.

Further the inlet (or exhaust) duration is 2 (A+B) where A is the angle subtended by the opening in the periphery of the valve and B is the angle subtended by the window. As both these angles are 45° in the case of JP patent 9-32518 the duration of the inlet or exhaust is restrained to be 180°.

Maximum inlet and exhaust duration of 180° is a necessary restraint on any design where a single rotary valve feeds two or more adjacent windows.

Both the zero overlap and maximum inlet and exhaust duration of 180° are formidable restraints on the design of any IC engine. While an engine with these restraints will work it will have a considerable maximum power disadvantage compared to modern IC engines which typically have 30° of overlap and 230° of duration.

A method of varying the phase between the valve and the crankshaft is also disclosed in JP patent 9-32518. This disclosure is for a device to make fine adjustments to the phase of the valve such that the valve can be maintained with the inlet port opening precisely at tdc on the induction stroke, and the exhaust opens precisely at bdc of the exhaust stroke. It is an adjustment mechanism to maintain the phase rather than a mechanism to vary the phase.

The essence of the present invention is the recognition that despite the fact a rotary valve incorporating both inlet and exhaust ports in the same valve, imposes considerable physical restraints on how the timing may be varied, other features unique to the rotary valve (in particular lack of valve protrusion into the combustion chamber) mean that advantages can be obtained by the use of an alternative strategy that makes use of these unique features. By dynamically changing the phase in response to the operating conditions of the engine improvements in load and emissions may be obtained. Further if changes in phase are combined with management of the throttle, smaller pumping losses will improve part throttle efficiency and improvements in NOx emissions will result.

SUMMARY OF INVENTION

According to a first aspect the present invention consists in a rotary valve internal combustion engine, said engine comprising a crankshaft, a throttle, a throttle actuator, a cylinder head, a combustion chamber, and at least one rotary valve, said rotary valve having at least two ports terminating as openings in its periphery, said cylinder head having a bore in which said rotary valve rotates, a window in said bore communicating with said combustion chamber, said openings successively aligning with said window by virtue of said rotation, and a drive mechanism comprising a phase change means, said drive mechanism driving said rotary valve, characterised in that said at least two ports comprise an inlet port and an exhaust port, and said phase change means applies a phase change in response to change in the operating conditions of said engine, said phase change occurring over at least one engine cycle of said engine.

Preferably said phase change means also applies a phase change in response to change at least one demand value sent to said engine, said phase change occurring over at least one engine cycle of said engine.

Preferably the maximum allowable magnitude of said phase change is large.

Preferably when said engine is operating at or near full load and said phase change is negative as speed of said engine decreases and said phase change is positive when speed of said engine is increasing.

Preferably said phase change is positive when said engine is cold and said phase change is negative when said engine has reached it operating temperature.

Preferably said drive mechanism is driven from said crankshaft.

Preferably said drive mechanism is an electric motor.

In one embodiment said phase change means comprises a source of hydraulic pressure, a hydraulic piston incorporating at least one helical spline, a first drive member with a mating helical spline slidingly meshed with said hydraulic piston, a second drive member with a second mating helical spline of opposite hand to said mating helical spline slidingly meshed with said hydraulic piston, at least one of either said mating helical spline or said second mating helical spline having a non zero helix angle, said first drive member driven by said crankshaft, said second drive member driving said rotary valve, said hydraulic piston moving axially in response to supply of pressure from said source of hydraulic pressure, said axial movement rotating said first drive member relative to said second drive member.

In another embodiment said phase change means comprises a source of hydraulic pressure, a first drive member incorporating a first set of radially extending vanes, a second drive member incorporating a second set of radially extending vanes, said second drive member mounted concentrically to said first drive member, said first set of radially extending vanes slidingly sealing against said second drive member, said second set of radially extending vanes slidingly sealing against first drive member such that a series of sealed hydraulic cavities are formed between said first set of radially extending vanes and said second set of radially extending vanes, said sealed hydraulic cavities connected to said source of hydraulic pressure, said primary drive member driven by said crankshaft, said secondary drive member driving said rotary valve, said primary drive member rotating relative to said secondary drive member in response to the application of hydraulic pressure from said source of hydraulic pressure to alternate said series of sealed hydraulic cavities.

Preferably said phase change means is operably connected to an electronic control unit which controls said phase.

Preferably said throttle actuator is operably connected to said electronic control unit which controls position of said throttle.

In another embodiment said drive mechanism comprises a primary drive means for transmitting motion between the crankshaft and said rotary valve, said primary drive means having at least one epicyclic gear set, and a secondary drive means driving a sun gear of said epicyclic gear set.

Preferably said secondary drive means is an electric motor.

Preferably said secondary drive means is operably connected to an electronic control unit which controls said phase.

Preferably said throttle is operably connected to said electronic control unit which controls position of said throttle.

In another embodiment said drive mechanism comprises an electric motor directly coupled to said rotary valve.

In another embodiment said drive mechanism comprises an electric motor driving at least one intermediate drive member operably engaged with said rotary valve. Preferably said at least one intermediate drive member comprises any one of a gear, gear train, chain drive assembly or belt drive assembly.

Preferably said electric motor is operably connected to an electronic control unit which controls said phase.

Preferably said throttle is operably connected to said electronic control unit which controls position of said throttle.

According to a second aspect the present invention consists in a rotary valve internal combustion engine, said engine comprising a crankshaft, a throttle, a throttle actuator, a cylinder head, a combustion chamber, and at least one rotary valve, said rotary valve having at least two ports terminating as openings in its periphery, said cylinder head having a bore in which said rotary valve rotates, a window in said bore communicating with said combustion chamber, said openings successively aligning with said window by virtue of said rotation, and a drive mechanism comprising a phase change means, said drive mechanism driving said rotary valve, characterised in that said at least two ports comprise an inlet port and an exhaust port, and said phase change means applies a phase change in response to change in at least one demand value sent to said engine, said phase change occurring over at least one engine cycle of said engine.

Preferably the maximum allowable magnitude of said phase change is large.

Preferably when said engine is operating at or near full load and said phase change is negative as speed of said engine decreases and said phase change is positive when speed of said engine is increasing.

Preferably said phase change is negative when said engine is cold and said phase change is positive when said engine has reached it operating temperature.

According to a third aspect the present invention consists in a rotary valve internal combustion engine, said engine comprising a crankshaft, a throttle, a throttle actuator, a cylinder head, a combustion chamber, and at least one rotary valve, said rotary valve having at least two ports terminating as openings in its periphery, said cylinder head having a bore in which said rotary valve rotates, a window in said bore communicating with said combustion chamber, said openings successively aligning with said window by virtue of said rotation, and a drive mechanism comprising a phase change means, said drive mechanism driving said rotary valve, characterised in that said at least two ports comprise an inlet port and an exhaust port, and said phase change means applies a phase change in response to change in at least one demand value sent to said engine and said throttle actuator maintains position of said throttle unchanged, said phase change occurring over at least one engine cycle of said engine.

Preferably in one operating configuration said throttle actuator maintains said throttle fully open.

Preferably said change in said at least one demand value requires said engine to operate at part or low load.

Preferably the maximum allowable magnitude of said phase change is large.

Preferably said phase change is negative when said change in said at least one demand value requires reduction in load of said engine and said phase change is positive when said change in said at least one demand value requires an increase in load of said engine.

Preferably said drive mechanism is driven from said crankshaft.

Preferably said drive mechanism is an electric motor.

According to a fourth aspect the present invention consists in a rotary valve internal combustion engine, said engine comprising a crankshaft, a throttle, a throttle actuator, a cylinder head, a combustion chamber, an electronic control unit and at least one rotary valve, said rotary valve having at least two ports terminating as openings in its periphery, said cylinder head having a bore in which said rotary valve rotates, a window in said bore communicating with said combustion chamber, said openings successively aligning with said window by virtue of said rotation, and a drive mechanism comprising a phase change means, said drive mechanism driving said rotary valve, characterised in that said at least two ports comprise an inlet port and an exhaust port, and said phase change means applies a phase change in response to a change in at least one demand value sent to said engine where said phase change is calculated by said electronic control unit as the maximum allowable phase change for the changed demand value and said throttle actuator changes position of said throttle to achieve said changed demand value, said phase change and said throttle change occurring over at least one engine cycle of said engine.

Preferably said electronic control unit calculates said maximum allowable phase change to achieve the maximum allowable internal exhaust gas recirculation at said changed demand value.

Preferably the maximum allowable magnitude of said phase change is large.

Preferably said throttle actuator maintains said throttle at or near full open when said at least one demand value require said engine to operate at low or part load.

Preferably said phase change means also applies a phase change in response to change in the operating conditions of said engine over at least one engine cycle of said engine.

Preferably said drive mechanism is driven from said crankshaft.

Preferably said drive mechanism is an electric motor.

Preferably said phase change means comprises a source of hydraulic pressure, a hydraulic piston incorporating at least one helical spline, a first drive member with a mating helical spline slidingly meshed with said hydraulic piston, a second drive member with a second mating helical spline of opposite hand to said mating helical spline slidingly meshed with said hydraulic piston, at least one of either said mating helical spline or said second mating helical spline having a non zero helix angle, said first drive member driven by said crankshaft, said second drive member driving said rotary valve, said hydraulic piston moving axially in response to supply of pressure from said source of hydraulic pressure, said axial movement rotating said first drive member relative to said second drive member.

MODE OF CARRYING OUT INVENTION

Figure 1:
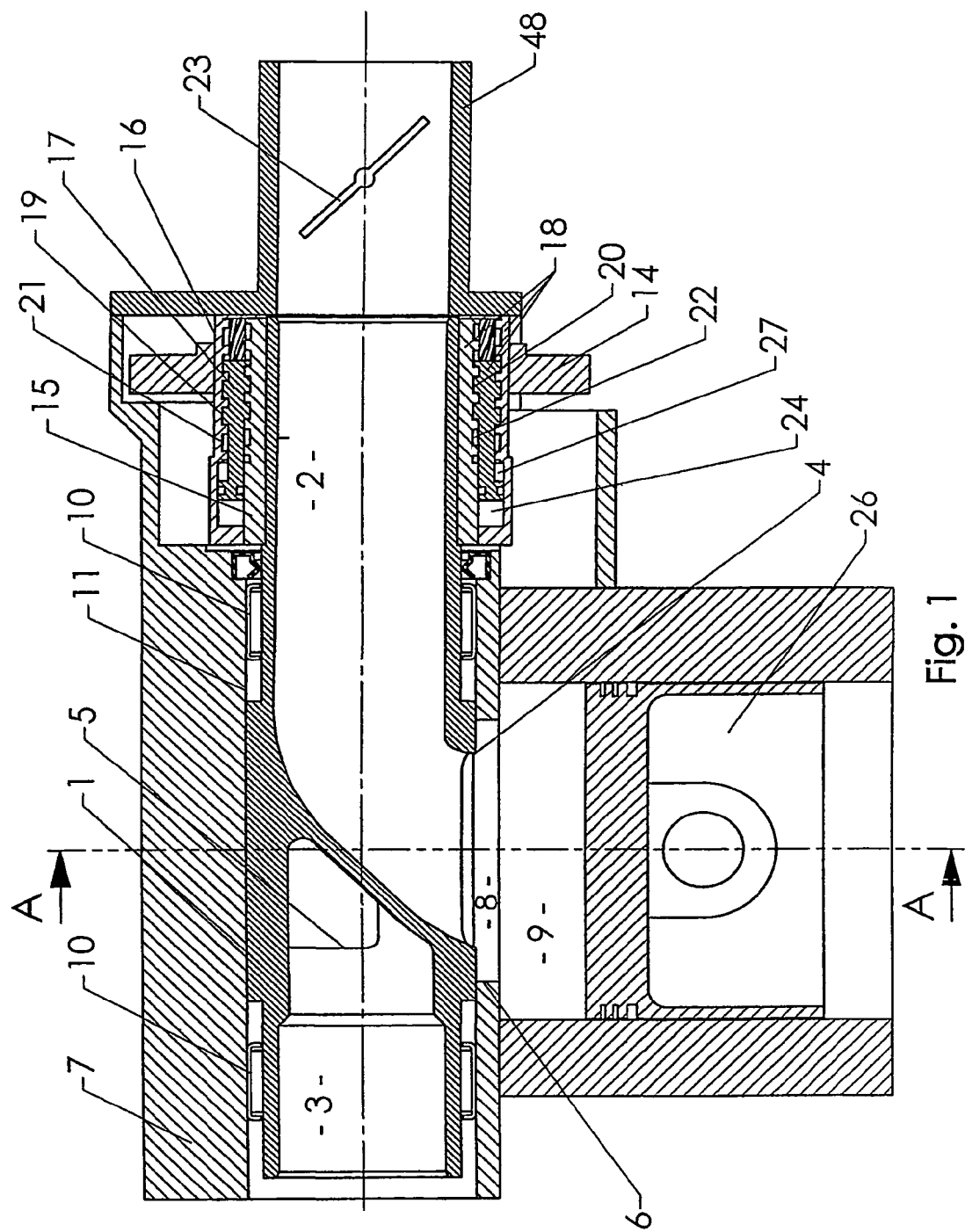
FIG. 1 is a cross sectional view of a first embodiment of a rotary valve engine having a variable valve timing mechanism in accordance with the present invention.
Figure 2:
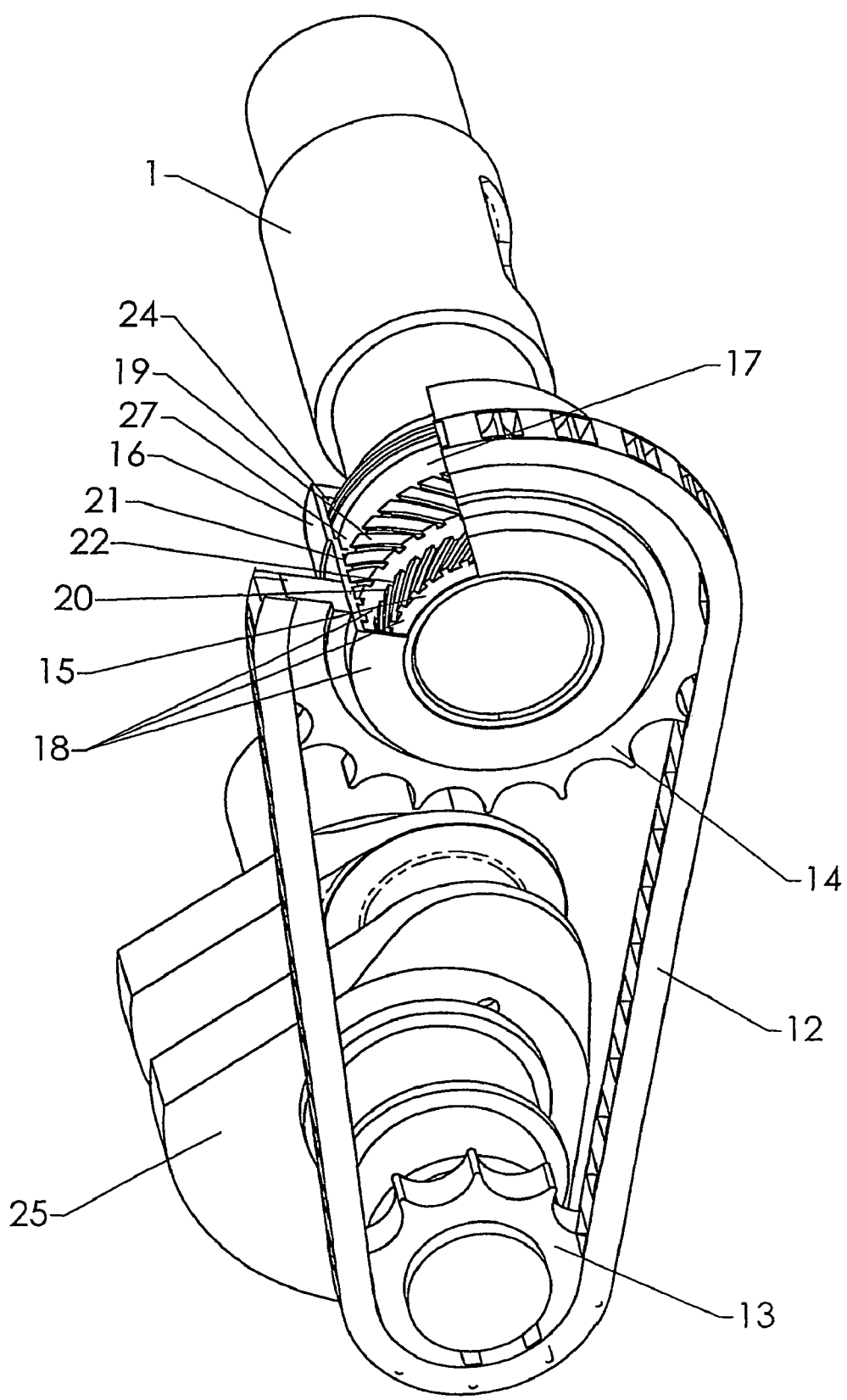
FIG. 2 is an isometric view of the first embodiment of a rotary valve engine having a variable valve timing mechanism in accordance with the present invention.

FIGS. 1 and 2 depicts a first embodiment of the present invention in which rotary valve 1 has an inlet port 2 at one end and exhaust port 3 at the other end. These ports respectively connect with openings 4 and 5 in the periphery of the central cylindrical portion of rotary valve 1. As rotary valve 1 rotates, openings 4 and 5 periodically align with a similar shaped window 6 in cylinder head 7 opening directly into combustion chamber 8 at the top of cylinder 9. This alignment allows the passage of gases to and from cylinder 9. During the compression and power strokes, the periphery of rotary valve 1 covers window 6 in cylinder head 7 preventing escape of gases from combustion chamber 8.

Rotary valve 1 is supported by two bearings 10 and has a small radial clearance to bore 11 of cylinder head 7. These bearings 10 allow the rotary valve 1 to rotate in bore 11 of cylinder head 7. A throttle actuator controls the position of throttle 23 that regulates the passage of air to cylinder 9.

Crankshaft sprocket 13 drives rotary valve sprocket 14 by chain 12. Rotary valve sprocket 14 drives rotary valve 1 through phase change means 18. Phase change means 18 consists of hub 15, outer sleeve 16 and hydraulic piston 17, as shown in FIG. 2. Hydraulic piston 17 has an external helical spline 19 that slidingly engages with a mating internal helical spline 21 in outer sleeve 16. Hydraulic piston 17 has an internal helical spline 20, of opposite hand to helical splines 19 and 21, that slidingly engages with a mating external helical spline 22 on hub 15. If desired either external helical spline 19 or internal helical spline 20 may have a zero helix angle.

Hydraulic fluid is supplied under pressure to either front cavity 24 or rear cavity 27 depending on the required direction of phase change. Supply of high pressure hydraulic fluid to front cavity 24 pushes hydraulic piston 17 in the direction away from cylinder 9 effecting a rotation of rotary valve 1 via hub 15 relative to sprocket 14 via outer sleeve 16, thus effecting a phase change between rotary valve 1 and crankshaft 25.

This embodiment provides a means whereby the valve timing of a rotary valve assembly for an internal combustion engine may be varied continuously. The present invention provides a means of varying the valve timing whilst maintaining the inlet duration, the exhaust duration and the overlap duration all constant. The variation in valve timing is achieved by effecting phase changes.

By "continuously" it is meant that the rotary valve timing may be altered from one cycle to the next cycle continuously.

Whilst the overlap duration of a single rotary valve 1 is fixed, its phase can easily be altered by mechanisms that are well known in the poppet valve technology. The mechanism shown in FIG. 2 is a typical example. The benefits arising from dynamically changing the phase may be appreciated by the following considerations.

Figure 6:
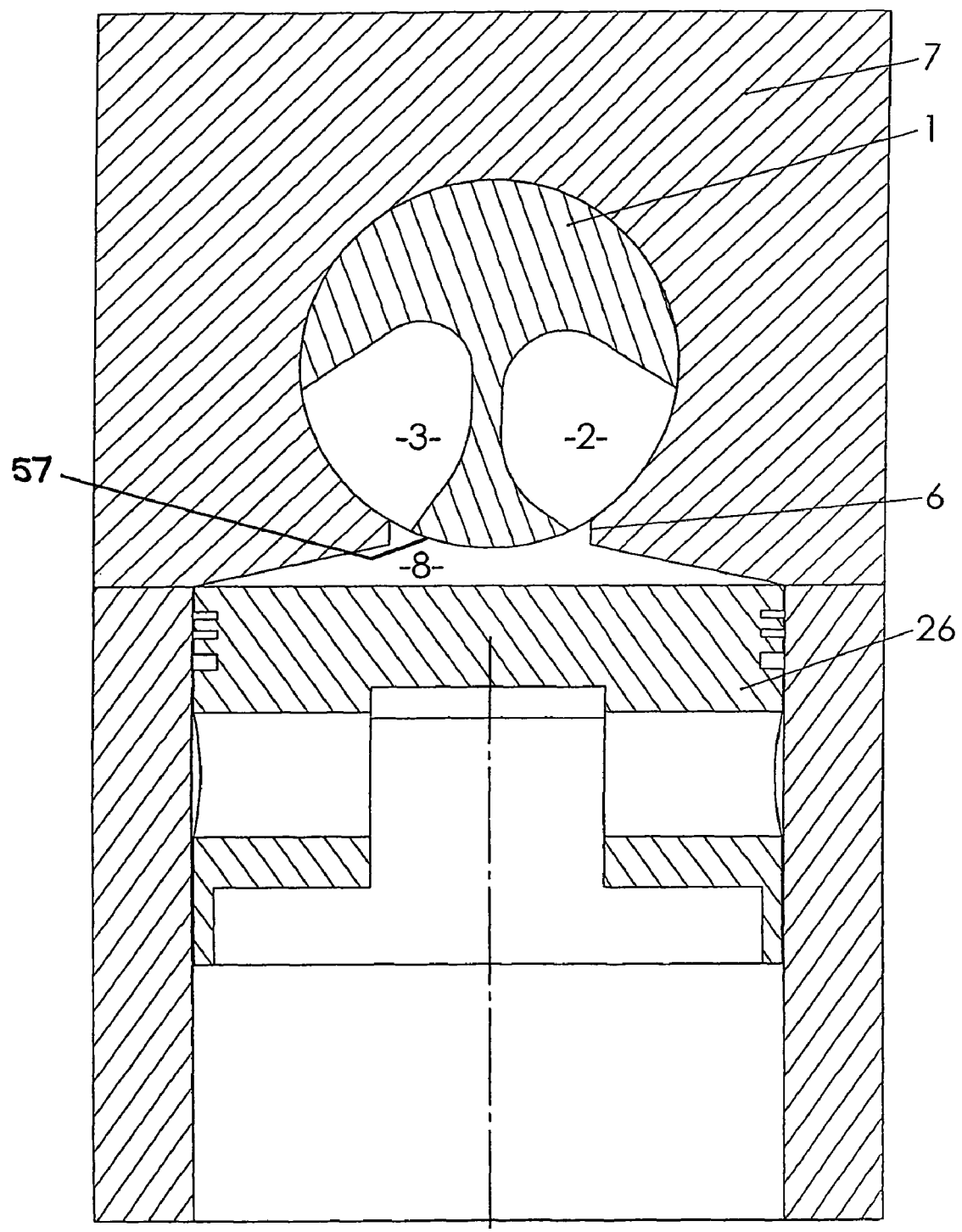
FIG. 6 is a sectional view on line M of FIG. 1.

At full throttle maximum power is generally obtained when the inlet open and the exhaust close points are symmetrical about tdc i.e. the bridge 57 of the rotary valve 1 is located in the centre of the window 6 at tdc (see FIG. 6). This allows the simultaneous discharge of burnt gas to the exhaust port 3 and the intake of fresh charge from inlet port 2 into the cylinder 9. This flow is maintained as a result of a positive pressure gradient between the inlet port 2 and the exhaust port 3. The exhaust and inlet systems can generally be designed such that at full throttle a negative pressure is obtained in the exhaust port 3 and positive pressure is obtained in the inlet port 2 at tdc overlap. This ensures the correct direction of flow of exhaust and inlet charge.

Modern IC engines generally have their inlet tract length adjusted such that at the design speed for maximum torque/power the pressure wave that traverses the inlet tract reach a maximum adjacent the entry point to the combustion chamber 8 at the instant the inlet valve closes. This ensures maximum supercharge of the air in the cylinder 9 and maximum power. At speeds lower than this design speed the positive pressure wave arrives at the entry point to the combustion chamber 8 prior to the inlet valve closing and thereafter decreases in magnitude. By the time the inlet valve closes the pressure will be lower than that achieved at the design speed. The further the engine speed is from the design operating speed the lower the pressure will be at the point of inlet valve closure. This reduces the pressure of the cylinder contents and the mass of fresh charge available for combustion.

In the event the inlet valve close point is retarded (i.e. the inlet closes earlier) with decreasing engine speed such that the valve closure more closely coincides with the occurrence of peak pressure at the entry point to the combustion chamber 8, (i.e. the valve head in the case of the poppet valve or the window 6 in the case of the rotary valve) maximum cylinder charging will continue to occur.

As both inlet port 2 and exhaust port 3 are on the same rotary valve 1, closing the inlet earlier will also result in the exhaust and overlap occurring earlier. Generally the earlier opening of the exhaust is detrimental as it reduces the amount of expansion work. However, the magnitude of this loss is small compared to the gains made by earlier closing of the inlet.

In the case of a cold engine, earlier opening of the exhaust is a benefit, as it will heat up the exhaust system and the catalyst faster. Consequently the catalyst will work sooner after start up from cold with reduced emissions.

Changing the overlap so that it occurs earlier opens the inlet earlier and closes the exhaust earlier. Overlap still occurs. The only difference is that instead of being centred about piston 26 at tdc, it is centred about piston 26 moving towards tdc. Provided that a suitable pressure gradient exists between the inlet port 2 and the exhaust port 3 the cylinder 9 will be suitably scavenged despite the fact the piston 26 is still rising, albeit slowly. Essentially any effects resulting from a phase change such that the overlap occurs earlier will be a second order effect at or near full load.

On an engine operating at full load the net effect of closing the inlet earlier as engine speed decreases, is to substantially increase the mass of fresh charge available for combustion against which must be subtracted small losses associated with earlier exhaust opening. The net effect is a gain in full load power at speeds below the design speed for maximum torque/power.

Whilst this strategy would not be considered optimum by designers of modern poppet valve engines or rotary valve engines with separate valves for the inlet or exhaust valves, where there is flexibility to vary the phase of the inlet and exhaust valves independently, it is an important improvement to the operation of a rotary valve 1 with both inlet port 2 and exhaust port 3 in the same valve. Rotary valve 1 with both inlet port 2 and exhaust port 3 in the same valve has many advantages over the poppet valve, that make it a preferable commercial embodiment. It also has some perceived disadvantages of which restraints on timing variation is one. This strategy addresses these concerns.

This invention seeks to further improve the operation of a rotary valve 1 with inlet port 2 and exhaust port 3 in the same valve by utilizing some of its unique features to change the way the engine operates at part load.

Conventional petrol IC engines regulate the engine load by way of the throttle. The throttle sets the demand values. There are two issues associated with the throttle. Firstly, at closed or part throttle air inducted into the engine has to be drawn in through a very small orifice (created by the closed throttle) resulting in pumping losses (i.e. negative work by the crankshaft to draw the air through the orifice) that adversely affect the efficiency of the engine. As most vehicle operation in cities occurs at part throttle this is a major issue as it leads to increased fuel consumption and $CO_2$ emissions. This problem has always been addressed on diesel IC engines where there is no throttle and the engine output is regulated by the amount of fuel that is injected.

Secondly, when the throttle is closed or partially closed it generates a vacuum in the inlet manifold. As a result, during overlap the pressure gradient is generally such that exhaust back flows into the cylinder and the inlet manifold. The magnitude of this back flow is difficult to control. Excessive back flow will result in too much exhaust gas being trapped in cylinder 9. Exhaust gas that is trapped in cylinder 9 by such a mechanism is known as internal exhaust gas recirculation or internal EGR. Whilst a certain amount of exhaust gas is required at part throttle to regulate the NOx emissions, excessive amounts will adversely affect the combustion stability leading to a "rough running" engine with increased Hydrocarbon (HC) emissions. Modern poppet valve engines control this by reducing the overlap and/or the valve lift when operating at part throttle.

The magnitude of the exhaust back flow is a function of the size of the overlap and the pressure gradient that exists between the inlet port 2 and the exhaust port 3 and the engine speed. At low engine speeds the time available for the back flow to occur is longer. On a rotary valve of the type described in U.S. Pat. No. 5,526,780, the inlet and exhaust opening rates are very high due to the absence of cam ramps. Consequently, the duration of the overlap required to achieve optimum performance can be small by conventional poppet valve standards. Typically a satisfactory result may be obtained with an overlap of just 20° or less. This in part addresses the issue of back flow by reducing its magnitude.

However in modern engines controlled EGR is required to control NOx emissions that are tightly regulated in most countries. A problem that exists with a rotary valve of the type described in U.S. Pat. No. 5,526,780 is not that internal EGR takes place, but the fact that it is difficult to control, given the multitude of different operating conditions an engine will experience at part load.

The present invention improves the part load efficiency of the IC engine by operating at or near full throttle for most engine part load conditions and minimizes exhaust NOx emissions by accurate control of internal EGR. It achieves this by a combination of phase change combined with management of the throttle position.

As discussed above, phase changes to the overlap will have little effect on the back flow of exhaust gas as the back flow is primarily determined by the overlap duration and the magnitude of the pressure gradient between inlet port 2 and exhaust port 3. Also as discussed above, rotary valve 1 allows the overlap duration to be substantially reduced compared to conventional poppet valves. By setting the throttle to wide open or near wide open, the vacuum that exists in the inlet port of a conventional IC engine at part load is eliminated. The removal of this vacuum means inlet port 2 and exhaust port 3 are now at similar pressures, and there is no longer a large pressure gradient pushing exhaust back into inlet port 2. Consequently, overlap flows and their variations due to different operating conditions can be reduced to level where they are no longer of consequence.

In the present invention control of the engine's load and speed is no longer primarily controlled by throttle 23, but by means of a phase change. The amount of fresh charge entering the engine can be controlled by selecting a suitable inlet valve close point. In the event the inlet valve close point can be varied indefinitely, throttle 23 can be left wide open and the inlet close point selected such that the required amount of air was trapped in the cylinder 9. This is a considerable improvement as the pumping losses incurred by drawing air through a near closed throttle are eliminated. These have been replaced by the losses incurred by pulling (during the induction stroke) the air through the orifice created between rotary valve 1 and window 6 and by pushing the air (during the compression stroke) out through the same orifice. As the effective size of the orifice created by rotary valve 1 and window 6 is much greater than the orifice created by the near closed throttle, pumping losses will be lower than in the conventional arrangements.

In many IC engines the phase change has an additional function to that of controlling the engine output. It must also manage the internal EGR to minimize NOx emissions. This is achieved as follows.

FIG. 6 shows piston 26 at tdc on the inlet stroke. Overlap is phased to achieve an optimum performance result at high engine speed and load. Typically inlet open occurs at 10° before tdc, and exhaust closes 10° after tdc. Typically the inlet close point would be arranged to occur 50° after bdc and the exhaust open point at 50° before bdc for optimum performance at high speed and high load.

Figure 7:
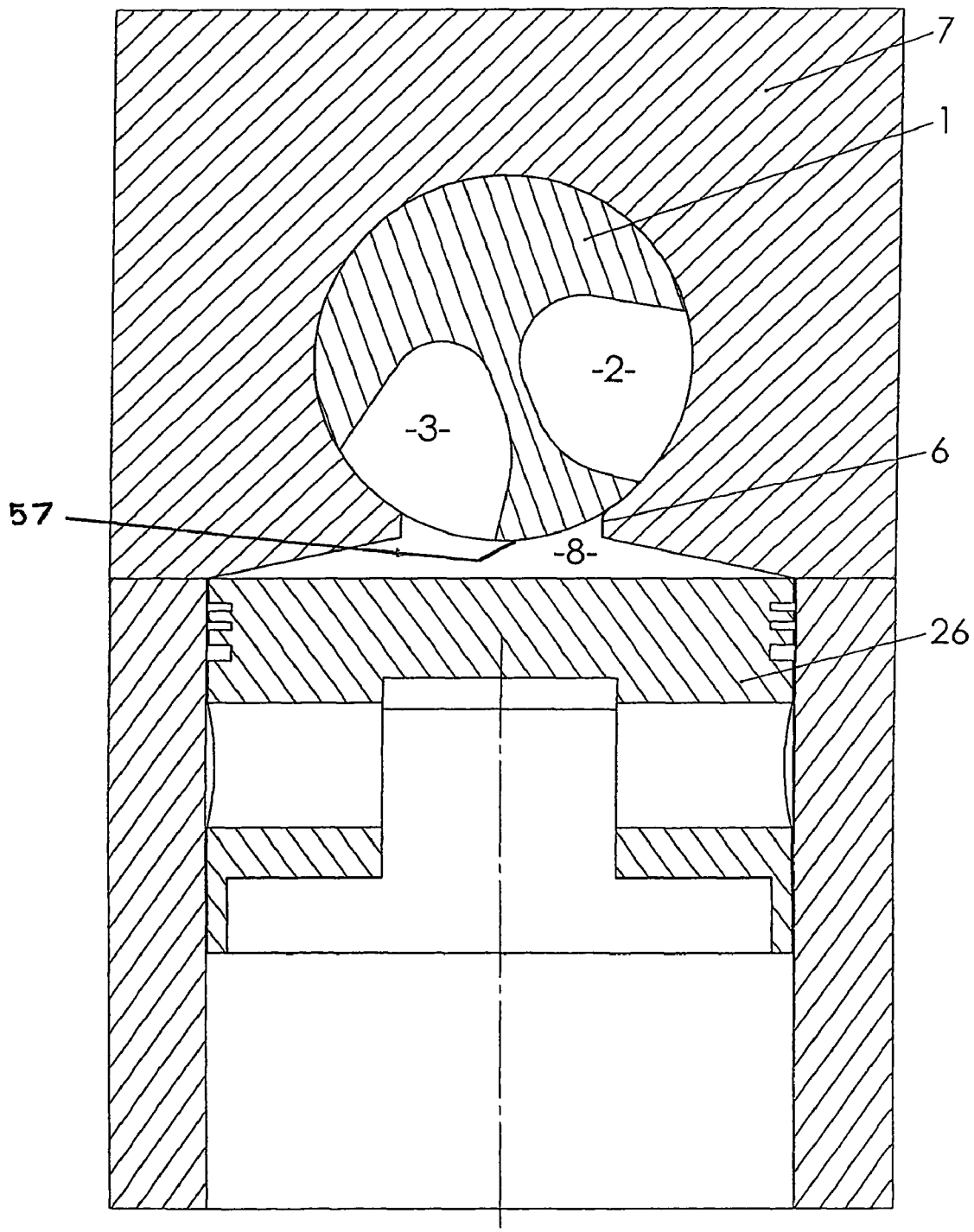
FIG. 7 is the sectional view of FIG. 5 but with the rotary valve phase shifted.

When the engine demand values change to low speed/low load, the present invention effects a phase change to manage both the required internal EGR during overlap and the engine's load and speed. Typically a 45° phase change may be introduced. FIG. 7 shows the relative position of piston 26 and rotary valve 1 when piston 26 is at tdc on the inlet stroke, and rotary valve 1 has been given a positive phase change of 45°. As piston 26 starts to descend after tdc, exhaust gas is drawn into cylinder 9 from exhaust port 3 while inlet port 2 remains closed. Later, when inlet port 2 opens and in the absence of a significant pressure gradient between inlet port 2 and exhaust port 3, (due to the wide open throttle) a fresh air fuel mixture is drawn from inlet port 2 into cylinder 9 simultaneously with flow from exhaust port 3 into cylinder 9. When exhaust port 3 closes, air and fuel continue to be drawn into cylinder 9 from inlet port 2. In this process the amount of internal EGR can be closely controlled by the magnitude of the phase change. The greater the phase change the greater the amount of internal EGR. During the remainder of the inlet stroke the internal EGR and the fresh air/fuel mixture are well mixed.

The inlet close point now occurs 95° after bdc. At high engine speed/high load, the inlet close point is arranged to occur after bdc to maximize the volume of fresh charge trapped in cylinder 9. It uses the momentum of the incoming air stream to continue to push air into cylinder 9 after bdc despite the fact piston 26 is moving up cylinder 9 at the start of the compression stroke. At low engine speed/low load there is insufficient momentum in the incoming air stream to continue filling cylinder 9 after piston 26 commences the compression stroke. The rising piston 26 reverses the flow of the incoming air stream and pushes it back out through inlet port 2. The conventional poppet valve strategy is to close the inlet valve earlier at low load/low speed operation to minimize the back flow of air and to maximize the volume of trapped air. Rather than producing an earlier inlet close point, the present invention produces a later inlet close point.

As piston 26 rises on the compression stroke the now mixed internal EGR and fresh air/fuel mixture is pushed out of cylinder 9 into inlet port 2 until inlet port 2 closes. During the following induction stroke this mixture of exhaust gas and fresh charge will be drawn back into cylinder 9 during the inlet stroke. The amount of exhaust gas pumped into inlet port 2 during the compression stroke is well controlled and is primarily a function of the overlap timing and the inlet close timing.

The magnitude of the required phase change is determined by two factors. Firstly, the amount of internal EGR required and secondly the demand values dictating the required engine load and speed. It is unlikely that these two requirements will result in the same required phase change. In the event the phase change required to satisfy the engine output is achieved prior to reaching the maximum allowable level of internal EGR, the phase change is made to satisfy the engine output requirements and the throttle is left fully open. In the event the maximum allowable level of internal EGR is achieved prior to sufficient phase change being made to accommodate the engine output, the phase change is locked at the point required to deliver maximum allowable internal EGR. At this setting the engine will produce more load than required. In this event throttle 23 is partially closed to further reduce the amount of fresh air being drawn into cylinder 9 during the induction stroke. In this case, throttle 23 is used as a trimming or fine tuning device.

In the event of very light load where minimum internal EGR is required to control the NOx emissions and smoothness of operation is paramount, the valve timing may be returned to its full throttle position and the throttle 23 is used in a conventional manner.

The exhaust open point now occurs 5° before bdc. This is a desirable result when the engine is operating at low load/low speed conditions. Normally at high load/high speed operation the exhaust needs to be opened well before bdc to ensure the exhaust pressure can be blown down before piston 26 reaches bdc and starts the compression stroke. If the exhaust hasn't blown down, excessive work will be done against the pressure remaining in cylinder 9 during the exhaust stroke. However this early exhaust open is at the sacrifice of some loss of work on the power stroke. In the event the engine is operating at low speed/low load the mass of burnt gas that has to be exhausted is small and the time available to achieve the blow down high. Consequently, it is desirable to open the exhaust later in these circumstances as it increases the amount of work delivered to crankshaft 25 during the power stroke.

In order to function in the above manner throttle 23 can no longer be hard-wired to the accelerator pedal but is controlled by the throttle actuator 59 which is in turn controlled by engine ECU 60. The accelerator pedal produces the demand values for the engine.

Demand values are those values sent to ECU 60 that dictate the values that the engine is required to produce. These demand values must always dictate the speed and load at which the engine is required to operate. The demand values may also dictate additional restraints on the operation of the engine. For example, a common additional restraint is the requirement for the engine to operate at a specific air fuel ratio. Demand values may be generated from several sources depending on the application. Typically in the case of an automotive engine the load and speed demand values are generated by the driver positioning the accelerator pedal.

In this case the engine output and the required level of internal EGR can be controlled by selecting a suitable combination of inlet close point and throttle position.

A feature of the present invention is that large phase changes are effected whilst maintaining fixed inlet and exhaust duration and fixed phasing of the inlet relative to the outlet.

Figure 8:
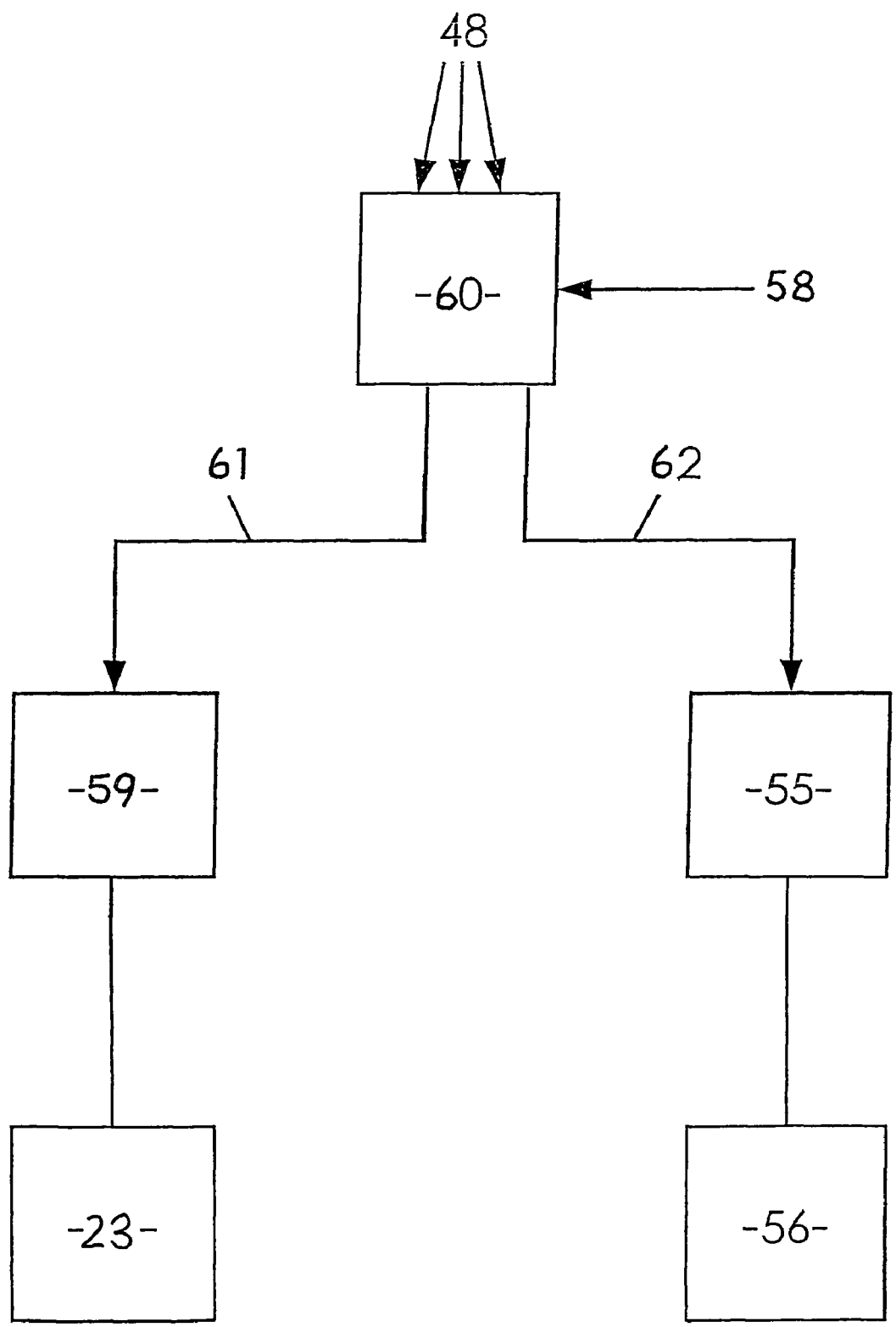
FIG. 8 is a block diagram showing the operation of the ECU.

The operation of ECU 60 is shown in FIG. 8. Sensors monitoring engine and engine operating parameters such as engine speed, engine load, engine temperature, and air temperature send signals 48 to ECU 60. Signal 58 from the accelerator pedal or some other input source sends the engine demand values to ECU 60. ECU 60 by means of either a look up table or calculation of algorithms or both determines the required phase and the required throttle position. ECU 60 outputs the control signals 61 and 62 to throttle actuator 59 and phase actuator 55 respectively. Phase actuator 55 drives phase change means 56 to the desired phase. Throttle actuator 59 drives throttle 23 to required position.

An example of this mode of operation is as follows. Consider an engine operating at full load. Its valve timing is as shown in FIG. 6 i.e. the overlap is centred in window 6 at tdc. In response to a change in the position of the accelerator pedal (i.e. to a change in the engine's demand values) that signals the requirement for the engine to change from full load to ⅓ load at the same engine speed. ECU 60 calculates the phase change that will allow the maximum allowable quantity of internal EGR for these engine operating conditions dictated by the demand values. ECU 60 also calculates the phase change required for the engine to run at ⅓ load with throttle 23 fully open. ECU 60 compares these phase change requirements. If they are the same, ECU 60 sends the phase actuator 55 a signal to phase change the calculated amount. In the event the phase change required for maximum internal EGR is greater than the phase change required to run the engine at ⅓ load ECU 60 sends phase actuator 55 a signal to phase change the amount required to run the engine at ⅓ load and fully open throttle. In the event the phase change required for maximum internal EGR is less than the phase change required to run the engine at ⅓ load and fully open throttle, ECU 60 sends the phase actuator 55 a signal to phase change the amount ECU 60 calculates, it will produce the maximum allowable internal EGR and sends throttle actuator 59 a signal to close throttle 23 sufficient for the engine to run at ⅓ load.

Figure 3:
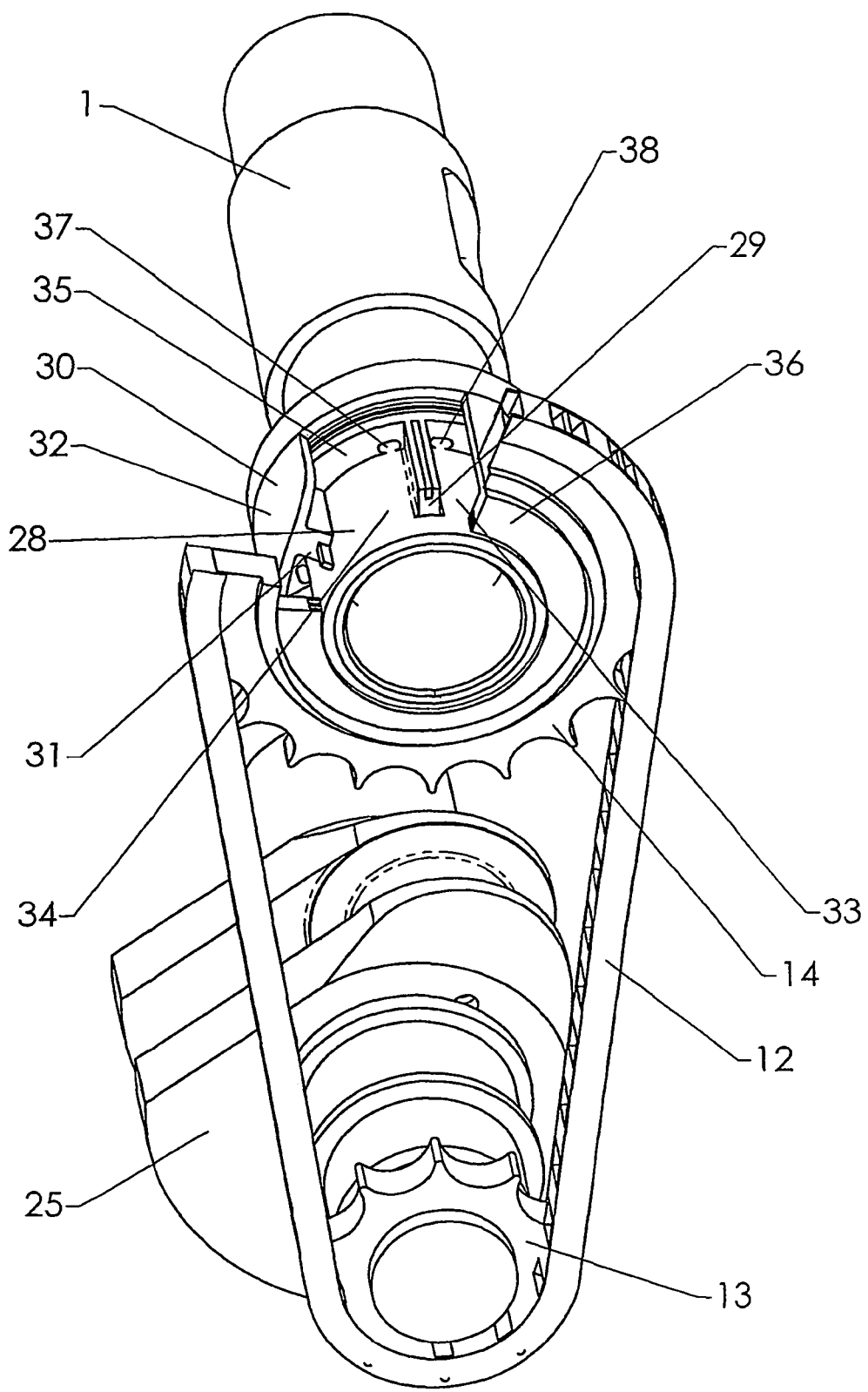
FIG. 3 is an isometric view of a second embodiment of a rotary valve engine having a variable valve timing mechanism in accordance with the present invention.

FIG. 3 depicts a second embodiment of the present invention in which crankshaft sprocket 13 drives rotary valve sprocket 14 by means of chain 12. Rotary valve sprocket 14 drives rotary valve 1 through phase change means 30. Phase change means 30 consists of outer sleeve 32 with internal radially extending vanes 31 which slidingly seal against the outside diameter of hub 28 and hub 28 with external radially extending vanes 29 that slidingly seal against inner diameter of outer sleeve 32. Hydraulic cavities 33 and 34 are formed between the inner diameter of outer sleeve 32, its internal radially extending vanes 31, the outer diameter of hub 28, its external radially extending vanes 29, the end face 35 of hub 28 and the end face 36 of outer sleeve 32.

Pressurized hydraulic fluid is fed to hydraulic cavities 33 and 34 via oil feed holes 38 and 37 respectively. Rotation of valve 1 via hub 28 relative to sprocket 14 is achieved by feeding high pressure hydraulic fluid into either cavities 33 via holes 38 or into cavities 34 via holes 37.

Figure 4:
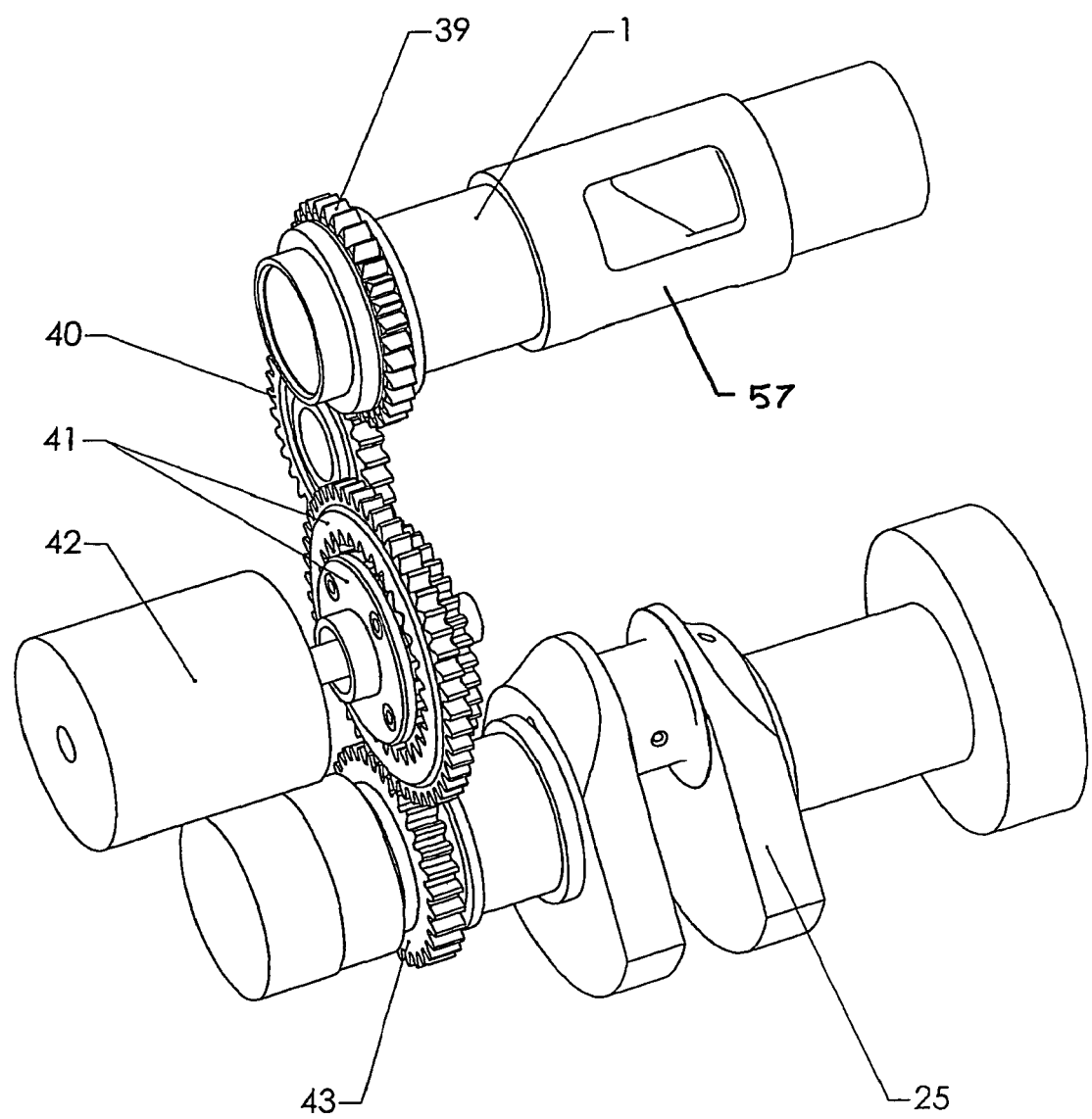
FIG. 4 is an isometric view of a fourth embodiment of a rotary valve engine having a variable valve timing mechanism in accordance with the present invention.
Figure 5:
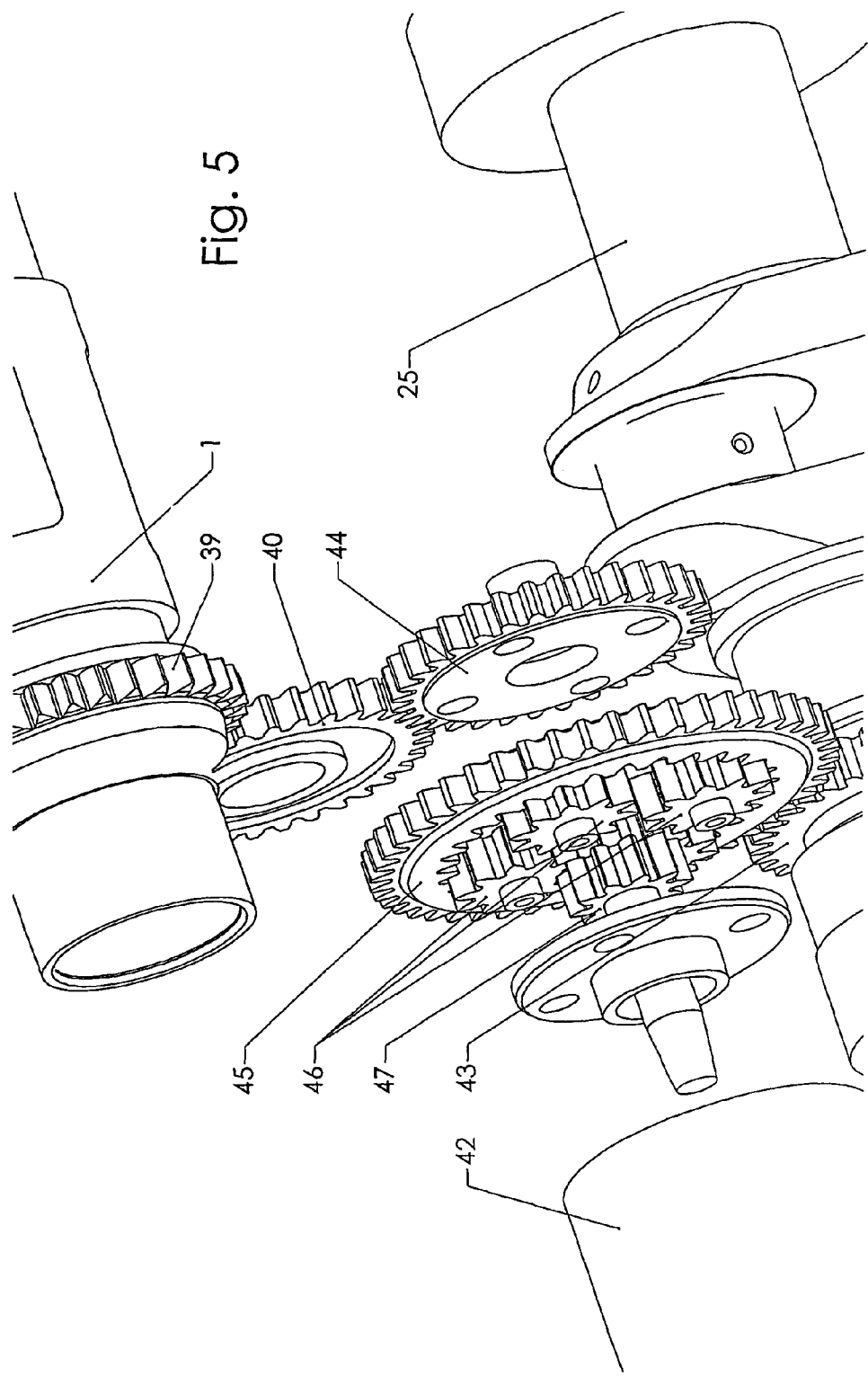
FIG. 5 is an exploded isometric view of FIG. 4.

In a third embodiment as shown in FIGS. 4 and 5, crankshaft gear 43 drives ring gear 45 of epicyclic gear set 41. Planet gears 46 drive gear 44 that drive rotary valve gear 39 through idler gear 40. Electric servomotor 42 drives sun gear 47 of epicyclic gear set 41. In the event the electric servo motor 42 is stationary or locked out, motion is transferred from the crankshaft gear 43 to the rotary valve gear 39 where rotary valve gear 39 maintains a constant angular velocity ratio to the crankshaft gear 43. When electric servo motor 42 drives sun gear 47 it either increases or decreases the angular velocity ratio between rotary valve gear 39 and crankshaft gear 43, depending on which direction sun gear 47 is rotated.

In this arrangement the gear drive from crankshaft 25 provides the gross motion and electric servomotor 42 provides the variation in motion required to vary the phase.

A fourth embodiment involves a variation of the arrangement shown in FIGS. 4 and 5, crankshaft gear 43 drives ring gear 45 of epicyclic gear set 41. Sun gear 47 drives gear 44 that drives rotary valve gear 39 through idler gear 40. Electric servomotor 42 drives planet gears 46 of epicyclic gear set 41. In the event the electric servo motor 42 is stationary or locked out, motion is transferred from the crankshaft gear 43 to the rotary valve gear 39 where rotary valve gear 39 maintains a constant angular velocity ratio to the crankshaft gear 43. When electric servo motor 42 drives planet gears 46 it varies the phase.

Figure 9:
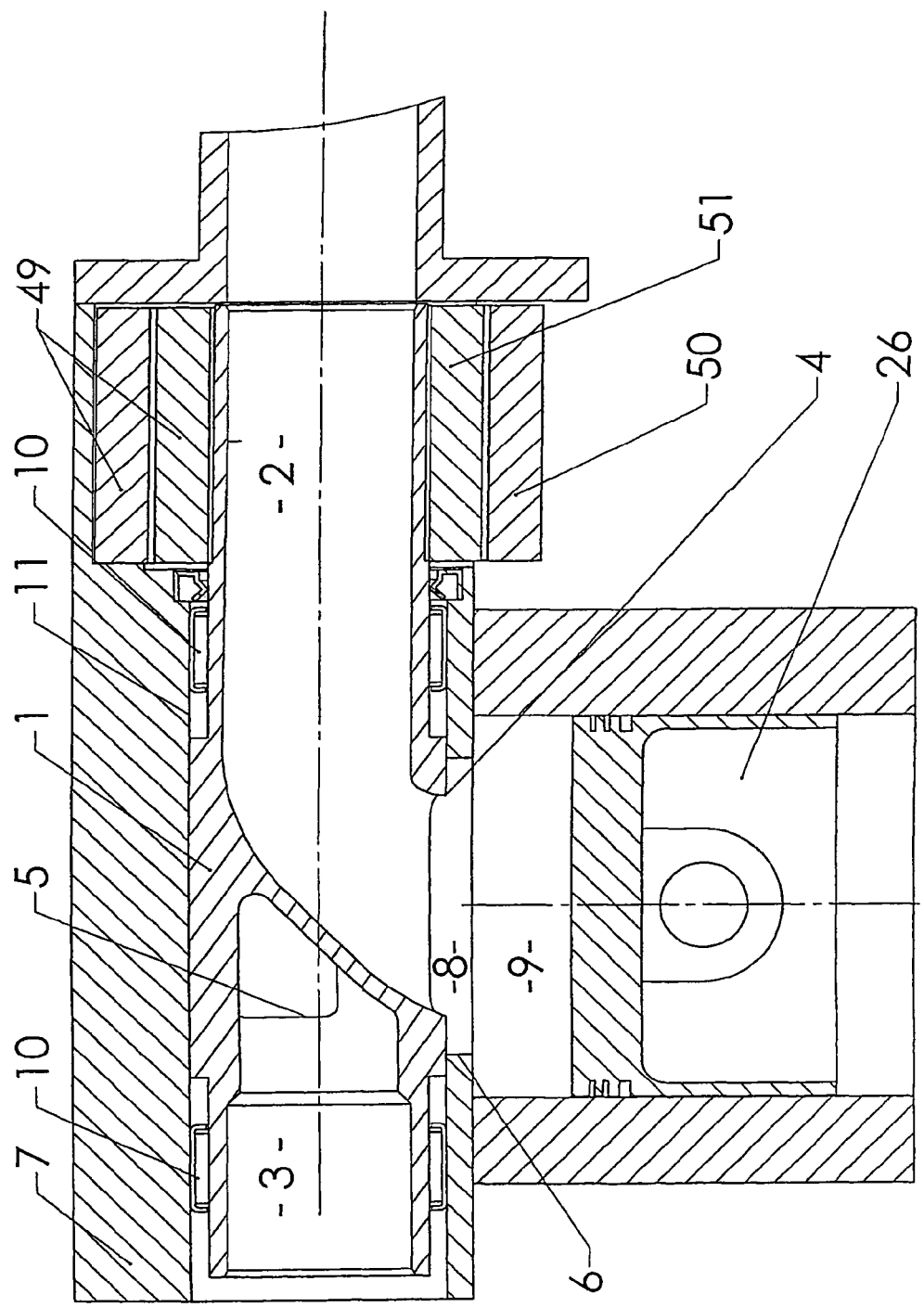
FIG. 9 is an cross sectional view of a fifth embodiment a rotary valve engine having a variable valve timing mechanism in accordance with the present invention.

A fifth embodiment is shown in FIG. 9. Rotary valve 1 is driven by hollow armature electric servomotor 49. Rotor 51 of hollow armature electric servomotor 49 is mounted on periphery of rotary valve 1 at the inlet end of rotary valve 1. Stator 50 of hollow armature electric servomotor 49 is mounted concentric to rotor 51.

Figure 10:
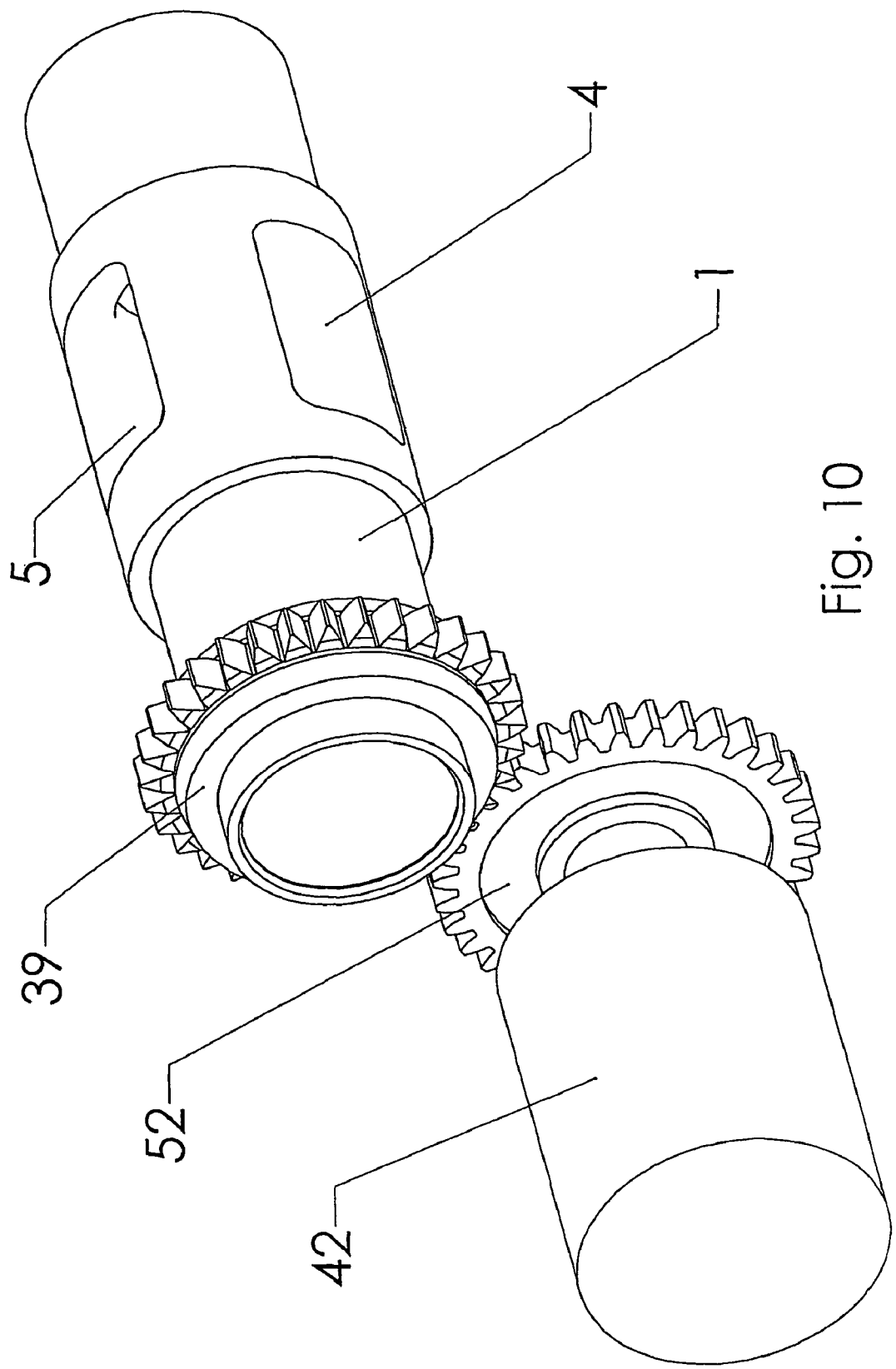
FIG. 10 is an isometric view of a sixth embodiment a rotary valve engine having a variable valve timing mechanism in accordance with the present invention.
Figure 11:
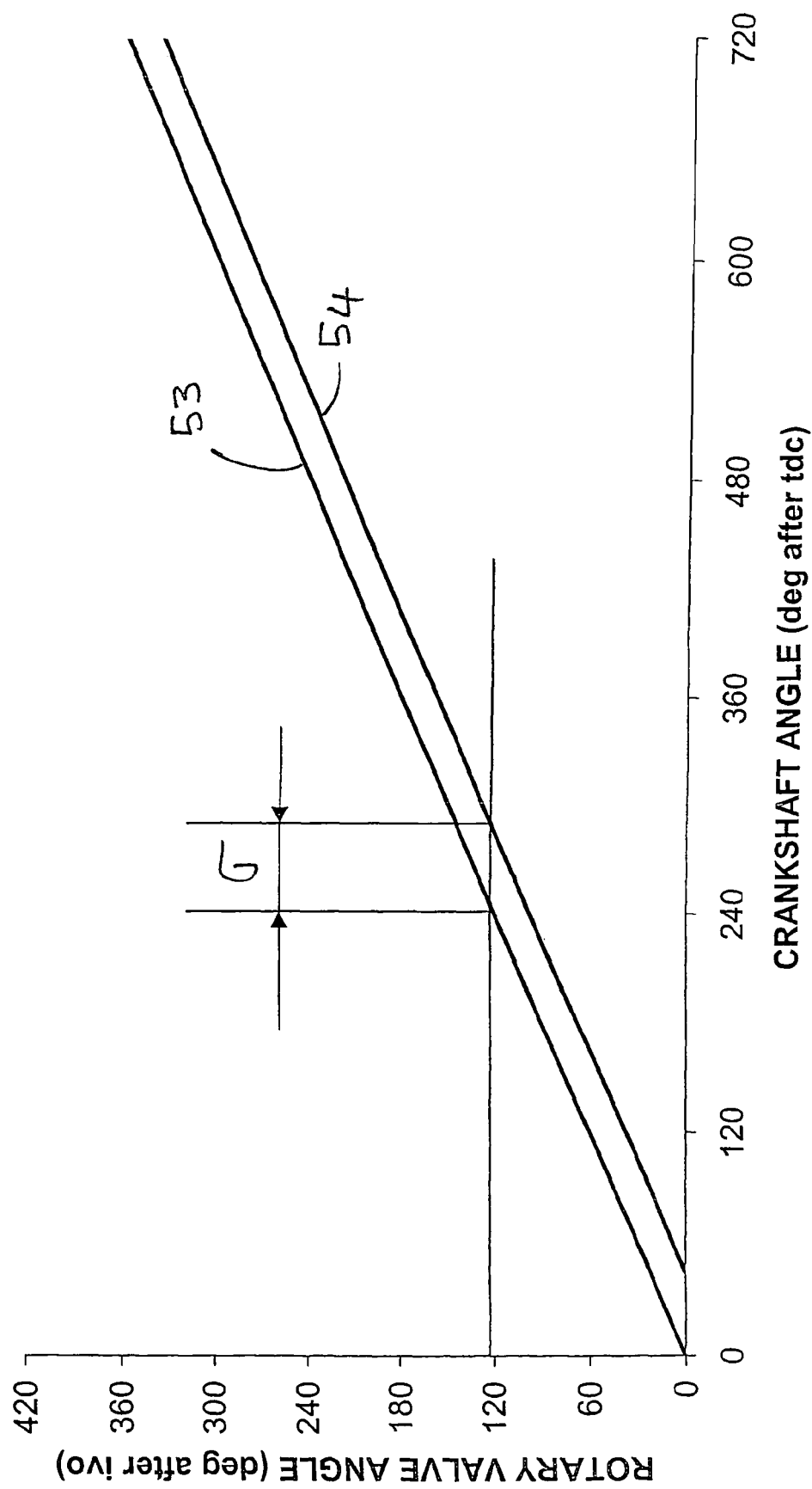
FIG. 11 is a chart used to define the meaning of "phase" and "phase change"

In a sixth embodiment as shown in FIG. 10 an electric servo motor 42 drives transfer gear 52 either directly or via a gear reduction box. Transfer gear 52 drives rotary valve gear 39 mounted on the periphery of the inlet end of rotary valve 1.

The term "comprising" as used herein is used in the inclusive sense of "including" or "having" and not in the exclusive sense of "consisting only of".

What is claimed is:

1. A rotary valve internal combustion engine, said engine comprising a crankshaft, a cylinder head, a combustion chamber, and at least one rotary valve, said rotary valve having an inlet port and an exhaust port, each terminating as an opening on the periphery of said rotary valve, said cylinder head having a bore in which said rotary valve rotates, a window in said bore communicating with said combustion chamber, said openings successively aligning with said window by virtue of said rotation, and a drive mechanism comprising a phase change means, said drive mechanism driving said rotary valve, said phase change means applying a phase change in response to change in the operating conditions of said engine, said phase change occurring over at least one cycle of said engine, characterized in that the magnitude of said phase change over the range of operating conditions of said engine is greater than 15°.

2. A rotary valve internal combustion engine as claimed in claim 1, wherein the magnitude of said phase change over the range of operating conditions of said engine is greater than 25°.

3. A rotary valve internal combustion engine as claimed in claim 2, wherein the the magnitude of said phase change over the range of operating conditions of said engine is at least 45°.

4. A rotary valve internal combustion engine as claimed in claim 1, wherein when said engine is operating at or near full load, said phase change is negative as the speed of said engine decreases and said phase change is positive as the speed of said engine increases.

5. A rotary valve internal combustion engine as claimed in claim 1, wherein said phase change is negative when said engine is cold and said phase change is positive when said engine has reached its operating temperature.

6. A rotary valve internal combustion engine as claimed in claim 1, wherein said drive mechanism is driven from said crankshaft.

7. A rotary valve internal combustion engine as claimed in claim 1, wherein said drive mechanism is an electric motor.

8. A rotary valve internal combustion engine as claimed in claim 1, wherein said phase change means also applies said phase change in response to change in at least one demand value sent to said engine.

9. A rotary valve internal combustion engine as claimed in claim 8, wherein said engine further comprises a throttle and a throttle actuator, and under certain engine operating conditions said phase change means applies said phase change in response to said change in said demand value sent to said engine whilst said throttle actuator maintains the position of said throttle unchanged.

10. A rotary valve internal combustion engine as claimed in claim 9, wherein said position of said throttle is fully open.

11. A rotary valve internal combustion engine as claimed in claim 9, wherein said change in said demand value requires said engine to operate at part or low load.

12. A rotary valve internal combustion engine as claimed in claim 9, wherein said phase change is positive when said change in said demand value requires a reduction in load of said engine, and said phase change is negative when said change in said demand value requires an increase in load of said engine.

13. A rotary valve internal combustion engine as claimed in claim 8, wherein said engine further comprises a throttle and a throttle actuator, said phase change means applying the maximum allowable phase change for said change in said demand value whilst said throttle actuator sets the position of said throttle to achieve said demand value.

14. A rotary valve internal combustion engine as claimed in claim 13, wherein said phase change and said position of said throttle are calculated by an electronic control unit.

15. A rotary valve internal combustion engine as claimed in claim 14 wherein said electronic control unit calculates said maximum allowable phase change to achieve the maximum allowable internal gas recirculation at said change in said demand value.

16. A rotary valve internal combustion engine as claimed in claim 1, wherein said phase change means comprises a source of hydraulic pressure, a hydraulic piston incorporating first and second splines, a first drive member driven by said crankshaft and slidingly meshing with said first spline and a second drive member driving said rotary valve and slidingly meshing with said second spline, at least one of said first and second splines being helical, said hydraulic piston moving axially in response to supply of pressure from said source of hydraulic pressure thereby rotating said first drive member relative to said second drive member.

17. A rotary valve internal combustion engine as claimed in claim 1, wherein said phase change means comprises a source of hydraulic pressure, a first drive member incorporating a first set of radially extending vanes, a second drive member incorporating a second set of radially extending vanes, said second drive member mounted concentrically to said first drive member, said first set of radially extending vanes slidingly sealing against said second drive member, said second set of radially extending vanes slidingly sealing against first drive member such that a series of sealed hydraulic cavities are formed between said first set of radially extending vanes and said second set of radially extending vanes, said sealed hydraulic cavities connected to said source of hydraulic pressure, said first drive member driven by said crankshaft, said second drive member driving said rotary valve, said first drive member rotating relative to said second drive member in response to the application of hydraulic pressure from said source of hydraulic pressure to alternate said series of sealed hydraulic cavities.

18. A rotary valve internal combustion engine as claimed in claim 1, wherein said phase change means is operably connected to an electronic control unit which controls said phase.

19. A rotary valve internal combustion engine as claimed in claim 1, wherein said drive mechanism comprises a primary drive means for transmitting motion between said crankshaft and said rotary valve, said primary drive means having at least one epicyclic gear set, and said phase change means comprises a secondary drive means driving a sun gear of said epicyclic gear set.

20. A rotary valve internal combustion engine as claimed in claim 19, wherein said secondary drive means is an electric motor.

21. A rotary valve internal combustion engine as claimed in claim 1, wherein said drive mechanism comprises an electric motor directly coupled to said rotary valve.

22. A rotary valve internal combustion engine as claimed in claim 1, wherein said drive mechanism comprises an electric motor driving at least one intermediate drive member operably engaged with said rotary valve.

23. A rotary valve internal combustion engine as claimed in claim 22, wherein said at least one intermediate drive member comprises any one of a gear, gear train, chain drive assembly or belt drive assembly.

24. A rotary valve internal combustion engine of as claimed in claim 1, wherein said rotary valve is an axial flow rotary valve.

* * * * *